(12) United States Patent
Camp

(10) Patent No.: US 6,240,852 B1
(45) Date of Patent: Jun. 5, 2001

(54) HIGHWAY-VEHICLE SYSTEM WITH IMPROVED BRAKING, ENHANCED STABILITY AND PROVISIONS FOR ELECTRIC POWER TAKE-OFF

(76) Inventor: William R. Camp, 3044 Green Valley Dr. Rd.Dr., East Point, GA (US) 30344

( * ) Notice: Subject to any disclaimer, the term of this patent is extended or adjusted under 35 U.S.C. 154(b) by 0 days.

(21) Appl. No.: 09/450,394

(22) Filed: Nov. 29, 1999

Related U.S. Application Data

(60) Provisional application No. 60/110,146, filed on Nov. 30, 1998.

(51) Int. Cl.$^7$ .................................................. B60M 1/34
(52) U.S. Cl. ...................... 104/140; 104/139; 104/249; 104/250; 104/251; 104/259; 191/23 R; 191/25
(58) Field of Search ................................. 104/139, 140, 104/249, 250, 251, 259, 26.2; 191/23 R, 25

(56) References Cited

U.S. PATENT DOCUMENTS

| | | | |
|---|---|---|---|
| 613,084 | * 10/1898 | Smith | 104/139 |
| 3,774,542 | * 11/1973 | Walsh | 104/89 |
| 4,228,998 | * 10/1980 | Trickel | 104/249 |
| 5,454,328 | * 10/1995 | Matsuzaki et al. | 104/139 |
| 5,778,796 | * 7/1998 | Kim | 104/130.07 |
| 5,992,575 | * 11/1999 | Kim | 188/38 |

FOREIGN PATENT DOCUMENTS

1743962A * 6/1992 (GB) .................................. 104/249

* cited by examiner

Primary Examiner—S. Joseph Morano
Assistant Examiner—Frantz F. Jules
(74) Attorney, Agent, or Firm—Harry I. Leon

(57) ABSTRACT

A highway-vehicle system for high speed travel which comprises a below-ground structure defining a cavity and a narrow slot extending upwardly therefrom to the roadway surface. Each vehicle in the system is equipped with a projecting member which, in its folded configuration, can be lowered into the slot. The projecting member includes a pair of stabilization wheels and a pair of hydraulically or pneumatically-actuated brake shoes. Once the projecting member has been lowered into the cavity, the wheels automatically unfold, so that they assume horizontal positions and press against opposing sidewalls of the cavity. With the wheels so deployed, the vehicle can be safely driven during high speed cornering and under windy conditions. The wheels can also be used to automatically steer each vehicle. In addition, the wheels are used to conduct electricity in the cavity sidewalls as part of the power takeoff for an electric vehicle. Like the wheels, the brake shoes also unfold once the projecting member enters the cavity. When braking is needed, hydraulic or pneumatic cylinders attached to each brake shoe press the shoes against the cavity sidewalls. Since the cavity is shielded from the weather, the brakes are kept dry for maximum braking efficiency. This system not only can be used in situations in which each vehicle is driven independently but also can be easily upgraded for computerized vehicle travel.

4 Claims, 6 Drawing Sheets

HIGHWAY-VEHICLE SYSTEM WITH IMPROVED BRAKING, ENHANCED STABILITY AND PROVISIONS FOR ELECTRIC POWER TAKE-OFF

RELATED U.S. PATENT APPLICATION

This application contains subject matter disclosed in my provisional patent application having Ser. No. 60/110,146, filed Nov. 30, 1998.

BACKGROUND OF THE INVENTION

Automobile travel is by far the most dangerous form of travel in this country. About 50,000 people are killed each year, and more than a million people are injured. At the same time, roads and highways are becoming more congested—a situation which lends itself to increased travel time and more accidents.

Various systems for keeping vehicles a safe distance apart even while they are traveling at high speeds have been studied since Rosenfeld, U.S. Pat. No. 1,983,882. One of the most recent such systems is disclosed by Butssuen et al., U.S. Pat. No. 5,574,644, which issued Nov. 12, 1996.

But each of the prior art combinations works best only when the vehicles involved are traveling under good road conditions. Their respective braking systems rely on tire-to-road surface contact, an approach which may fail during heavy rain or snow events.

Further, these vehicles depend on tire-to-road surface contact for stability when cornering. Even though many accidents are caused when a driver loses control of his vehicle while turning, the prior art has largely ignored this problem.

SUMMARY OF THE INVENTION

The primary object of the present invention is to provide an improved transportation system in which existing highways and overroad vehicles are modified in such a way that not only can the vehicles travel safely at high speeds, but also both the total number of accidents and the average travel time are reduced.

A further object of the present invention is provide such an improved transportation system in which vehicles can be braked efficiently even under bad road conditions caused by rain, snow or the like.

A still further object of this invention is to provide an improved transportation system in which the degree of contact between ground structures and vehicles travelling thereon is sufficient to stabilize the latter under windy conditions or during high speed cornering.

A still further object of the present invention is to provide an improved transportation system utilizing vehicles equipped with controls which an operator can set, at the outset of a trip, to select the destination of his or her choice and which will then direct the vehicle to this destination without further intervention on the part of the operator.

The improved transportation system according to the present invention comprises a structure which defines at least one elongated cavity with a pair of opposing vertical sidewalls situated beneath a generally conventional roadway surface. Disposed on each of the vertical sidewalls are at least one braking surface insert and at least one contact plate for vehicle stabilization. The structure further defines a slot which communicates with the cavity and extends upwardly therefrom to the road surface, this slot being sufficiently narrow that vehicles with standard automobile tires or larger can drive over the top of the slot without difficulty.

The improved transportation system further comprises a plurality of vehicles, each vehicle having at least one retractable, projecting member. Prior to use, the projecting member, which extends longitudinally and downwardly from the vehicle, is lowered through the slot; and, once through it, elements of the projecting member, including a pair of wheels and a pair of brake shoes, unfold within the cavity. When unfolded, each wheel is in a position to rotate horizontally about its own vertical axis; and as the wheel rotates, it presses against the track-like contact plate. Preferably, two such tracks are spaced apart from and mounted generally parallel to each other within the opposing sidewalls of the cavity. Each track is utilized to stabilize the vehicle as it travels around curves or under high wind conditions. Electrical contacts for powering electric vehicles are preferably also located within the track.

In addition, the improved transportation system comprises braking means rotatably connected to the projecting member. The braking means includes a pair of elongated brake shoes and hydraulic or pneumatic cylinders, the brake shoes, in the preferred embodiment, being attached to the distal ends of double shafts in each cylinder. When the cylinders are activated, the brake shoes interact with braking surface inserts mounted on the opposing vertical sidewalls of the cavity. The braking means, which is kept dry under all weather conditions, offers superior performance over that currently available in conventional automobiles.

DETAILED DESCRIPTION OF THE PREFERRED EMBODIMENT

Figure 1:
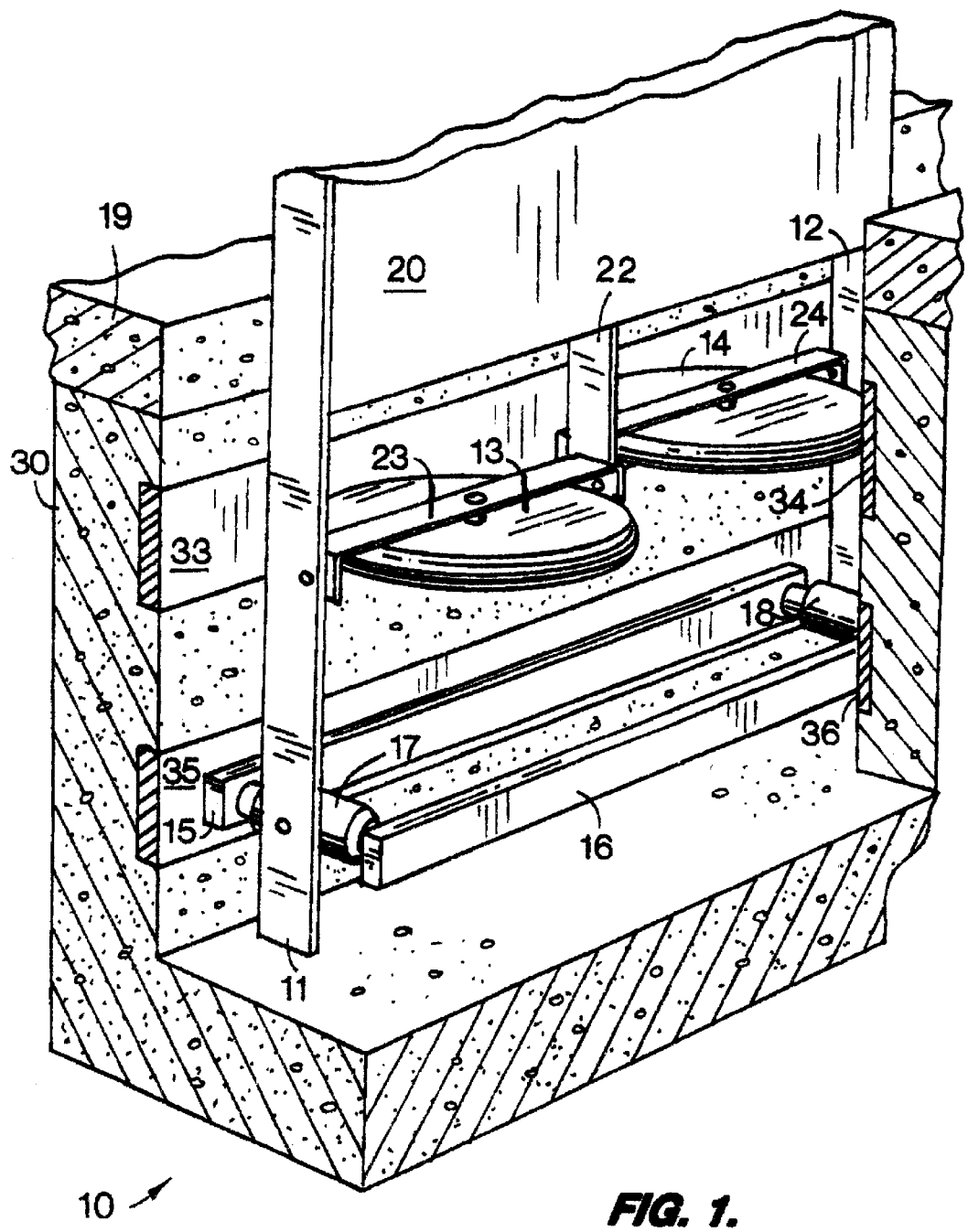
FIG. 1 is a right side perspective of the improved transportation system according to the present invention showing a partial cutaway of a roadway beneath which is disposed an elongated cavity and a projecting member, the projecting member extending downwardly from an overroad vehicle (not shown), the stabilization wheels and brake shoes connected to the projecting member being shown in unfolded position, ready for operation.
Figure 2:
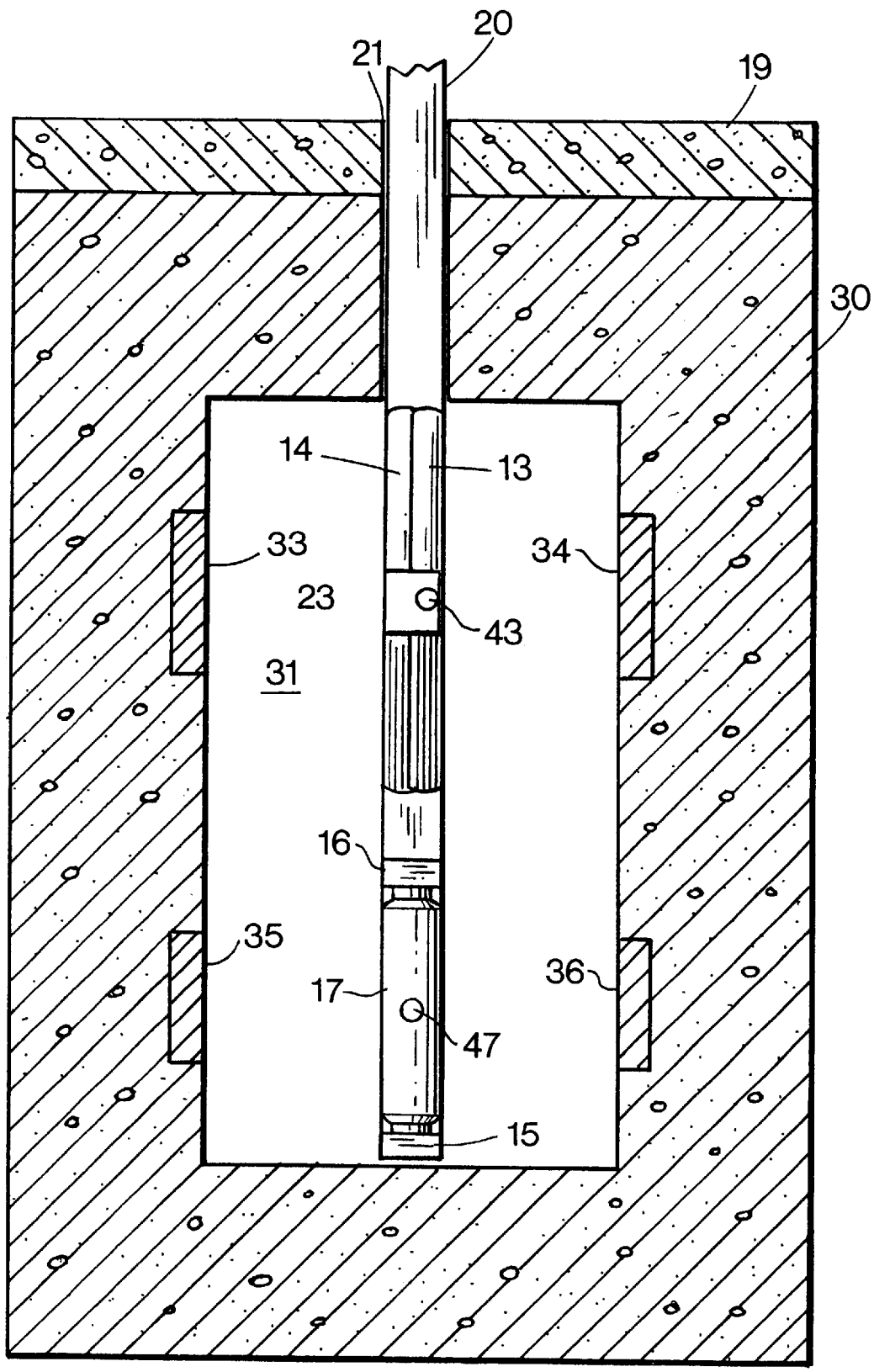
FIG. 2 is an enlarged front elevational view, in cross-section, of the cavity and of the projecting member according to FIG. 1, the stabilization wheels and brake shoes being shown in folded position.
Figure 3:
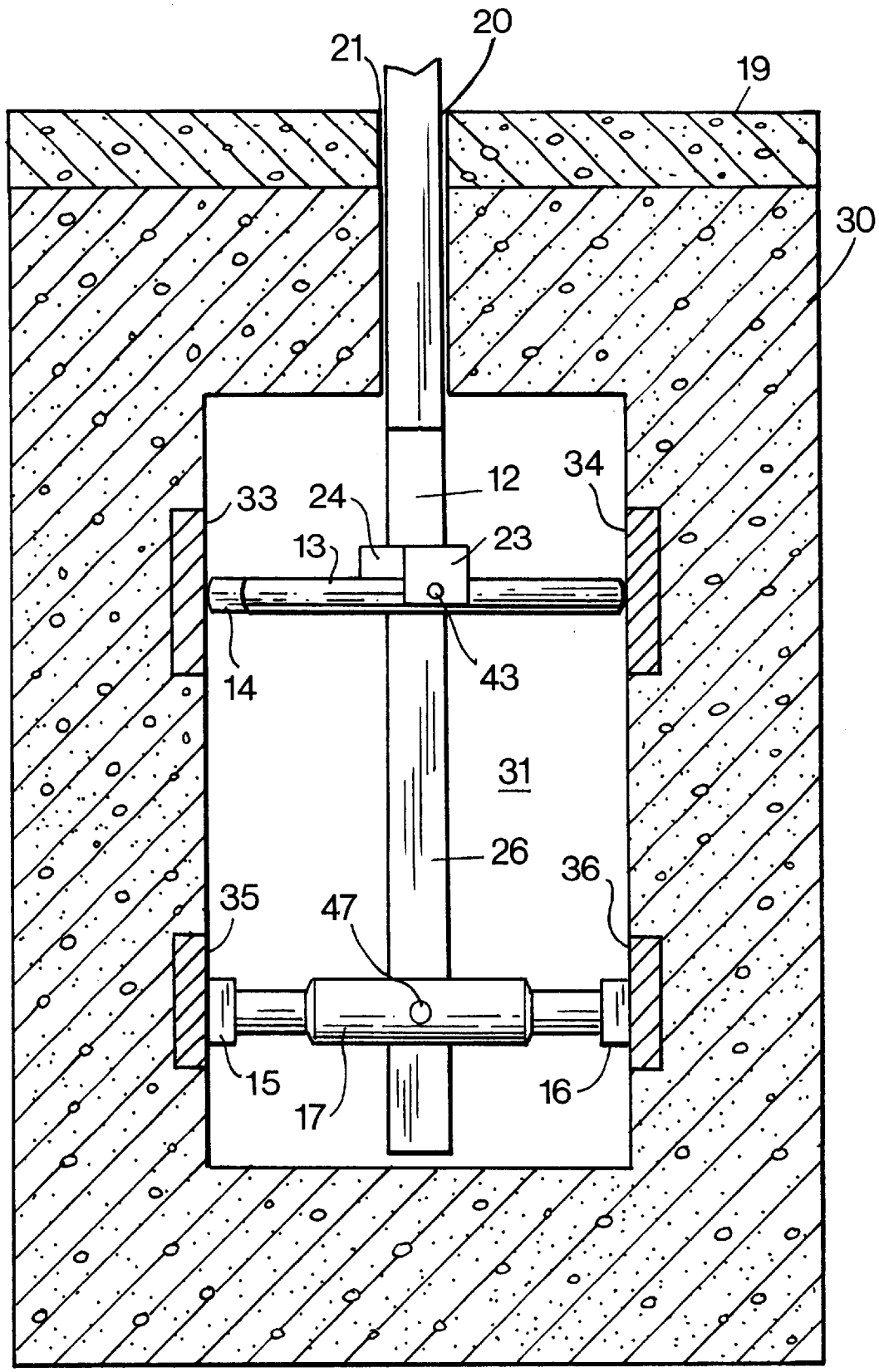
FIG. 3 is an enlarged front elevational view, in cross-section, of the cavity and of the projecting member according to FIG. 1, the stabilization wheels and brake shoes being shown in unfolded position.

In the drawings, an improved vehicle-highway system, indicated generally by the reference numeral 10, comprises at least one projecting member 20 and a below-ground structure 30 which defines an elongated cavity 31 generally in the shape of a hollow, rectangular prism (FIGS. 1–3). Each projecting member 20 is mounted on the undercarriage of a road vehicle (not shown) and includes at least one pair of stabilization wheels 13, 14 and at least one pair of brake shoes 15, 16. The cavity 31, which can be situated in the road bed beneath a conventional highway 19, measures, by way of example, about 24 inches in depth and has an inside transverse width of about 13 inches.

Communicating with the elongated cavity 31 is a narrow slot 21 which opens onto the roadway surface (FIGS. 2 and 3). The slot 21 is sized to receive each projecting member 20 when its stabilization wheels 13, 14 and brake shoes 15, 16 are deployed in a folded configuration (FIG. 2). The slot 21 is preferably only about 2 inches wide, so that vehicles with standard automobile tires or larger can drive over the top of the slot without difficulty.

Within the cavity 31, contact plates 33, 34 and brake surface inserts 35, 36 are mounted on the upper and lower portions, respectively, of its opposing parallel sidewalls. In the preferred embodiment, the plates 33, 34 and inserts 35, 36 are disposed flush with the sidewall to which they are attached. In use, the plates 33, 34 are used as tracks for the stabilization wheels 13, 14; and the braking surface inserts 35, 36 interact with the brake shoes 15, 16 when hydraulic or, alternately, pneumatic cylinders connected thereto are actuated (FIG. 3).

Figure 4:
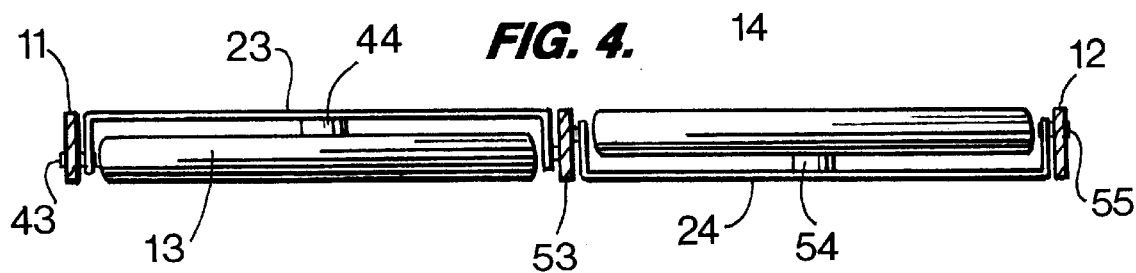
FIG. 4 is a top plan view of the stabilization wheels according to FIG. 1, the stabilization wheels being shown in folded position, the remainder of the projecting member except for fragmentary portions of the support arms therein being deleted for clarity of illustration.
Figure 5:
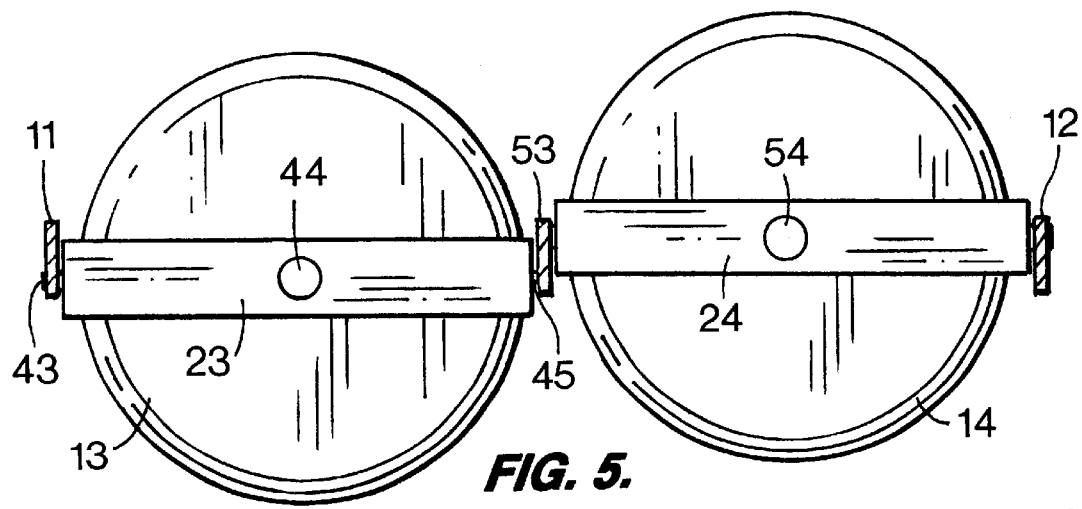
FIG. 5 is a top plan view of the stabilization wheels according to FIG. 4, the stabilization wheels being shown in unfolded position.
Figure 6:
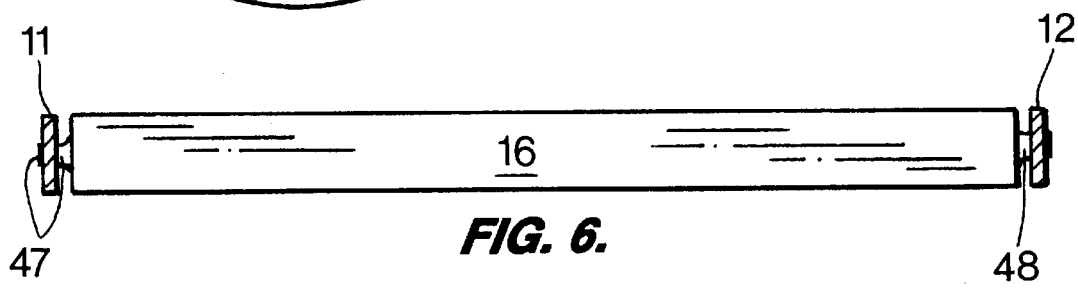
FIG. 6 is a top plan view of the brake shoes according to FIG. 1, the brake shoes being shown in folded position, the remainder of the projecting member except for fragmentary portions of the support arms therein being deleted for clarity of illustration.
Figure 7:
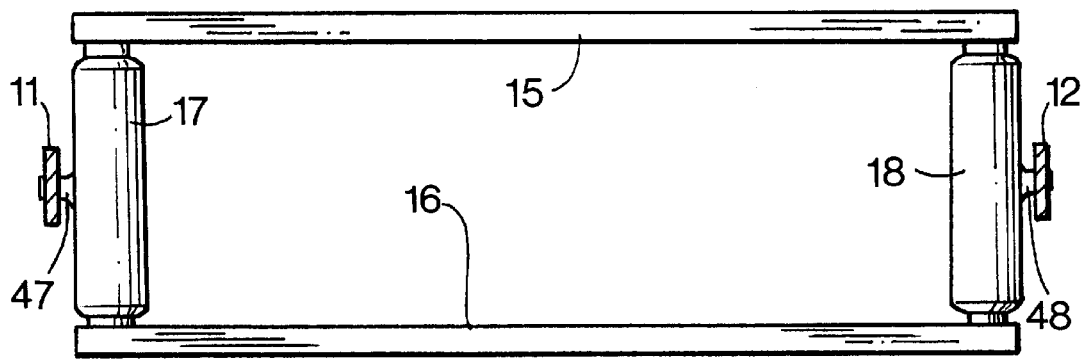
FIG. 7 is a top plan view of the brake shoes according to FIG. 6, the brake shoes being shown in unfolded position.
Figure 8:
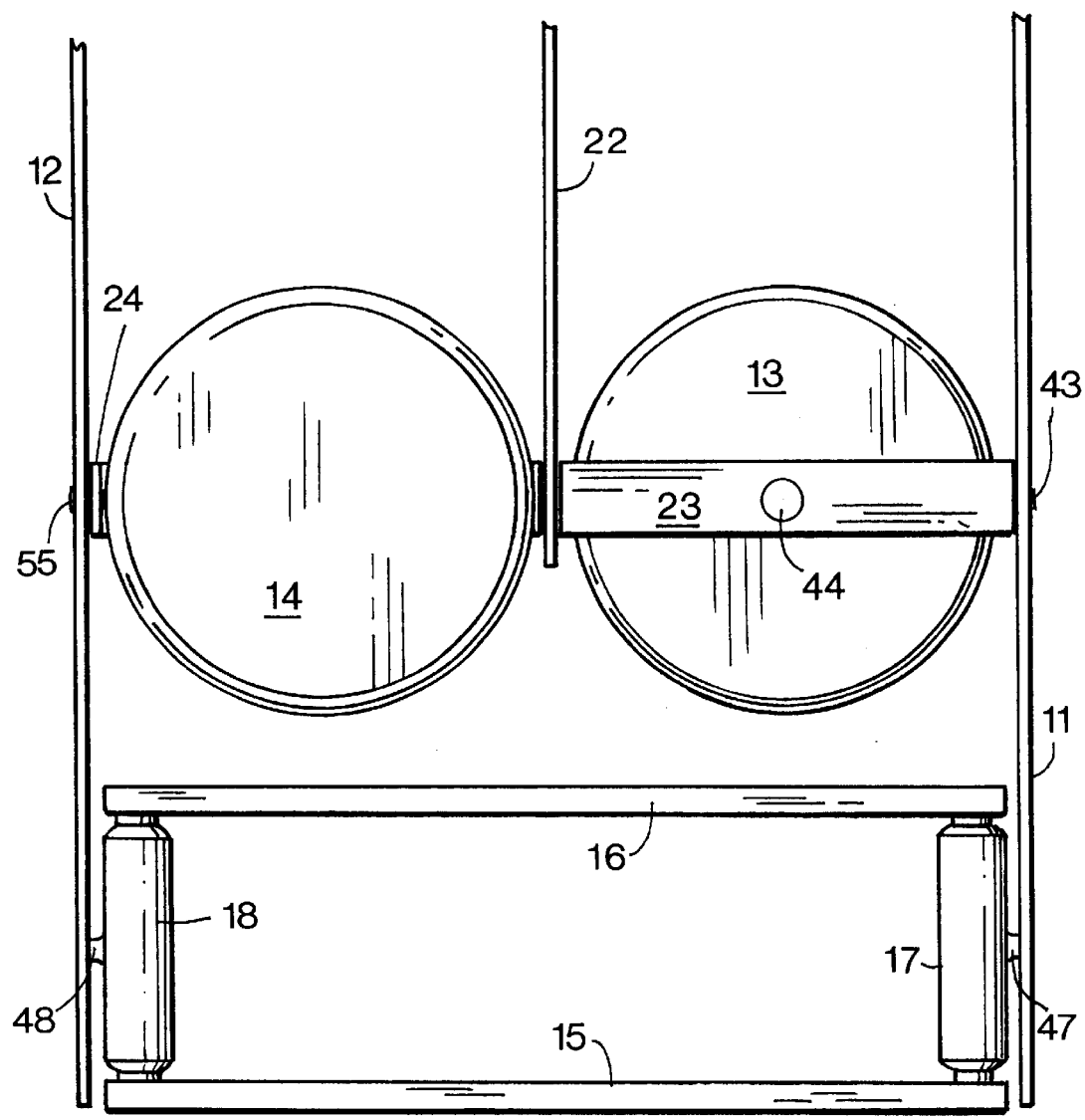
FIG. 8 is a side elevational view of the projecting member according to FIG. 1, the stabilization wheels and brake shoes therein being illustrated in folded position.
Figure 9:
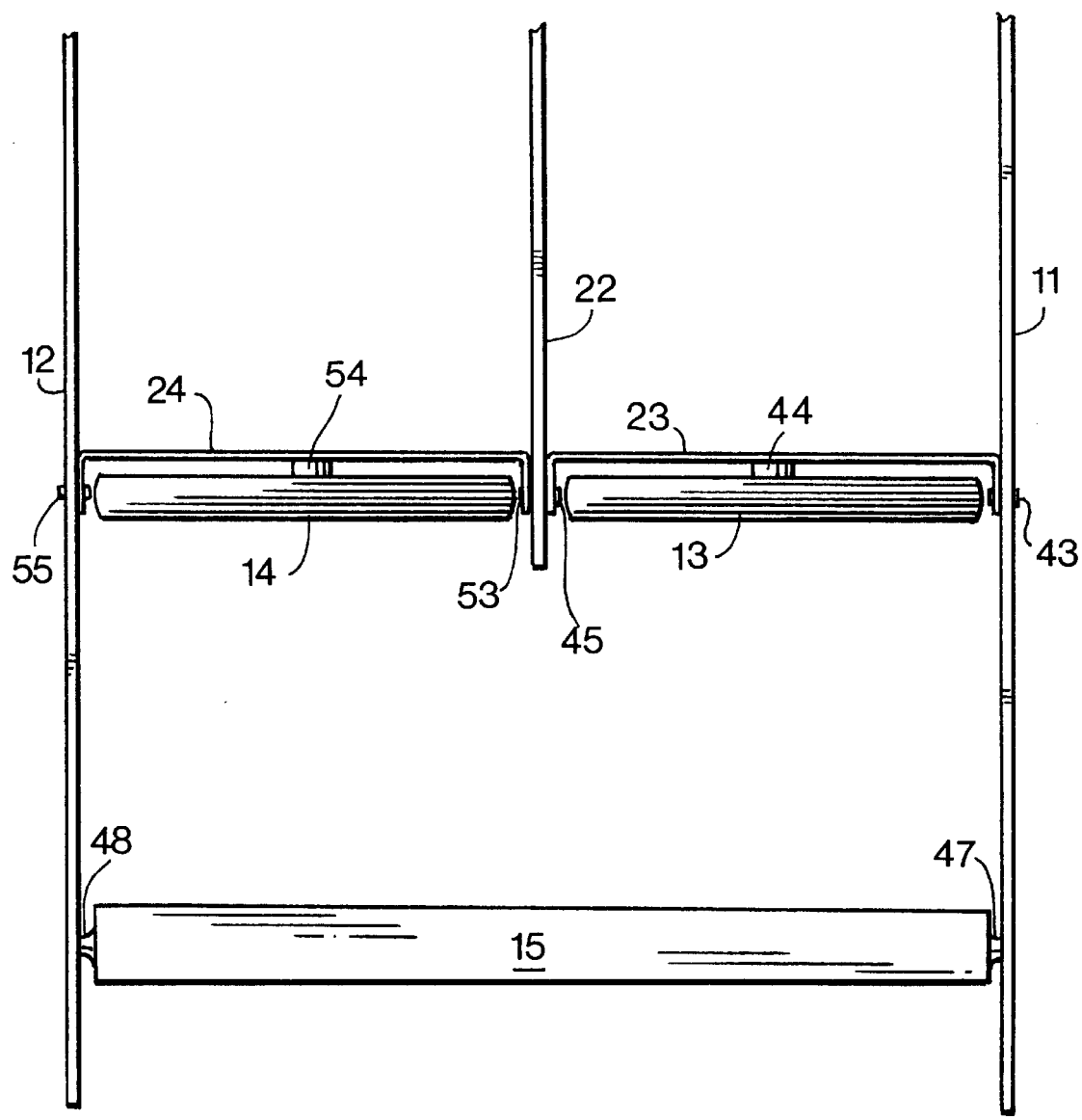
FIG. 9 is a side elevational view of the projecting member according to FIG. 1, the stabilization wheels and brake shoes therein being illustrated in unfolded position.

Each stabilization wheel 13, 14 is rotatably mounted on a bracket 23, 24 and turns about pins 44, 54, respectively, attached thereto. The brackets 23, 24 themselves are pivotally connected by pins 43, 45; 53, 55 to support arms 11, 22; 22, 12, respectively, within the projecting member 20 (FIGS. 4, 5 and 9). The wheels 13, 14 are unfolded with the use of electric servo motors (not shown). Alternately, stepping motors or hydraulic or pneumatic cylinders (not shown) can be utilized. As long as the wheels 13, 14 are fully unfolded, they continue to press against the tracks 33, 34, respectively.

For use with electrical vehicles, the contact plates 33, 34 are preferably electrical conductors; and the stabilization wheels 13, 14 also serve as contacts to draw power for the vehicle motor (not shown). Batteries (not shown) of the vehicle can be simultaneously charged as the vehicle draws power from the tracks 33, 34.

Braking means comprises two hydraulic or pneumatic cylinders with housing 17, 18 pivotally mounted on pins 47, 48 connected to support arms 11, 12 of the protecting member 20. Each housing 17, 18 is rotated with the use of an electric servo motor or, alternately, a stepping motor or hydraulic or pneumatic cylinder (not shown). During operation, the ends of each cylinder 17, 18 hold the brake shoes 15, 16 close to, and preferably within a few thousandths inch of, the braking surface inserts 35, 36, respectively (FIG. 3). The braking means can be controlled by the vehicle driver or, alternately, a computer programmed to keep proximate vehicles a safe distance apart.

The system 10 allows all weather operation since the slot 21 allows only a relatively small amount of moisture to enter the cavity 31 which can easily be removed by floor drains to storms sewer pipes (not shown).

It is understood that those skilled in the art may conceive other applications, modifications and/or changes in the invention described above. Any such applications, modifications or changes which fall within the purview of the description are intended to be illustrative and not intended to be limitative. The scope of the invention is limited only by the scope of the claims appended hereto.

It is claimed:

1. A highway-vehicle system, comprising:
   (a) a structure which defines a narrow slot and an elongated cavity with vertical sidewalls, the cavity being substantially wider in transverse cross-section than the slot, the slot communicating with the cavity and extending upwardly therefrom to the highway surface; and
   (b) a projecting member which is mounted on the vehicle and is suspended downwardly therefrom, the projecting member having elongated support arms which are insertable into the slot; the support arms having stabilizing means and braking means pivotally connected thereto which, after the support arms are inserted into the slot, are rotated into proximity with the vertical sidewalls; the stabilizing means and braking means being positioned, during use, so as to engage the vertical sidewalls below the slot.

2. A highway-vehicle system, comprising:
   (a) a structure which defines a narrow slot and an elongated cavity with sidewalls, the cavity being substantially wider in transverse cross-section than the slot, the slot communicating with the cavity and extending upwardly therefrom to the highway surface; and
   (b) a projecting member which is mounted on the vehicle and extends downwardly therefrom, the projecting member having elongated support arms which are insertable into the slot; the support arms having stabilizing means and braking means pivotally connected thereto which, in use, are positioned so as to engage the sidewalls below the slot, the stabilizing means including a pair of stabilization wheels, each wheel being held in a vertical position within the projecting member while the elongated support arms are being inserted into the slot and wherein each wheel is subsequently rotated into a horizontal position prior to use, each wheel pressing against at least one of the sidewalls during use.

3. The system according to claim 1, wherein the braking means comprises at least one brake shoe and one pair of spaced apart, elongated hydraulic cylinders, distal ends of the brake shoe being fastened to the cylinders, the brake shoe and cylinders being stored in a vertical configuration in which the cylinders are disposed generally parallel to the longitudinal axis of the elongated support arms while the support arms are being inserted into the slot and wherein the cylinders are subsequently rotated into a horizontal position, the cylinders, upon their being actuated in said horizontal position, pressing the brake shoe against at least one of the sidewalls.

4. A transportation system, comprising:
  (a) a structure which is disposed beneath the vehicle during use, the structure defining a narrow slot and an elongated cavity with at least one vertical sidewall, the cavity being substantially wider in transverse cross-section than the slot, the slot communicating with the cavity and extending upwardly therefrom;
  (b) at least one conductive strip mounted on the sidewall, the conductive strip being electrically charged;
  (c) a projecting member which is mounted on the vehicle and extends downwardly therefrom, the projecting member having elongated support arms which are insertable into the slot; the support arms having at least one pair of stabilization wheels pivotally connected thereto which, in use, are positioned so as to engage the sidewall below the slot; and
  (d) each of the stabilization wheels having a conductive surface for receiving electrical power from the conductive strip.

* * * * *